(12) United States Patent
Kachline

(10) Patent No.: US 8,338,754 B2
(45) Date of Patent: Dec. 25, 2012

(54) COMMON TOOL CENTER POINT CONSUMABLES

(75) Inventor: Jeffrey L Kachline, Highland Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 305 days.

(21) Appl. No.: 12/771,747

(22) Filed: Apr. 30, 2010

(65) Prior Publication Data

US 2011/0266269 A1 Nov. 3, 2011

(51) Int. Cl.
*B23K 9/10* (2006.01)

(52) U.S. Cl. .................................. 219/137.71; 219/138
(58) Field of Classification Search .............. 219/137.71, 219/138
See application file for complete search history.

(56) References Cited

U.S. PATENT DOCUMENTS

| | | | |
|---|---|---|---|
| 3,534,389 A | 10/1970 | Bernard et al. | |
| 4,695,702 A | 9/1987 | Gartland | |
| 5,384,447 A * | 1/1995 | Raloff et al. | 219/137.31 |
| 6,078,023 A * | 6/2000 | Jones et al. | 219/137.63 |
| 6,512,195 B2 | 1/2003 | Domschot | |
| 2004/0079784 A1 * | 4/2004 | Giese | 228/44.3 |
| 2009/0212027 A1 * | 8/2009 | Borowy et al. | 219/121.48 |

FOREIGN PATENT DOCUMENTS

| | | |
|---|---|---|
| DE | 19513458 | 10/1996 |
| EP | 015100 | 1/1985 |
| FR | 2789921 | 2/1999 |
| FR | 2829413 | 9/2001 |
| GB | 185777 | 9/1922 |

OTHER PUBLICATIONS

2005 Welding Components and Parts Guide, Miller Hobart, MillerWelds.com.
Tough Gun Clutch specification sheet.

* cited by examiner

*Primary Examiner* — Hoai V Ho
(74) *Attorney, Agent, or Firm* — Benesch, Friedlander, Coplan & Aronoff LLP

(57) ABSTRACT

A consumable is configured to operate in a robotic welding torch. The robotic welding torch includes a torch body and a tube. The tube has an elongated body extending from a supply end to a discharge end. The tube is operably connected substantially at the supply end to the torch body. The tube is configured to operably connect at the discharge end to a first set of consumables in a first configuration and to a second set of consumables in a second configuration. The first set of consumables has a first amperage capacity and the second set of consumables has a second amperage capacity substantially larger than the first amperage capacity. The tool center point of the robotic welding torch is substantially constant between the first configuration and the second configuration.

20 Claims, 5 Drawing Sheets

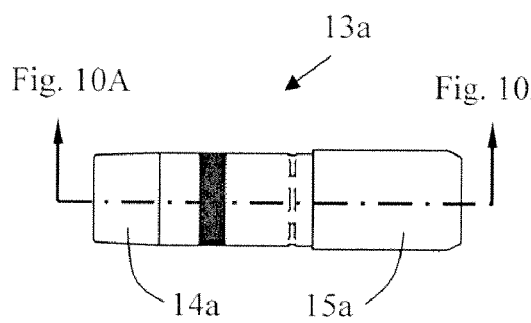
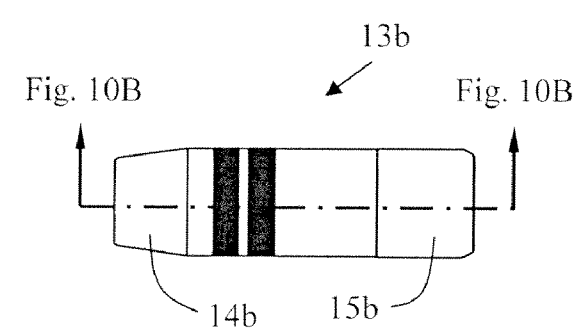
Fig. 9A                                   Fig. 9B
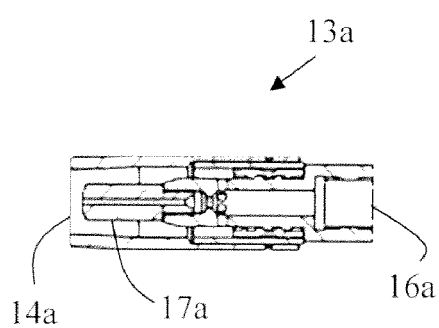
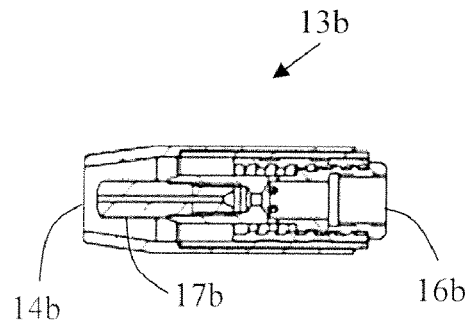
Fig. 10A                                  Fig. 10B

COMMON TOOL CENTER POINT CONSUMABLES

FIELD OF INVENTION

The present disclosure relates generally to the field of robotic welding. More particularly, the present disclosure relates to sets of welding consumables having a common tool center point.

BACKGROUND

In robotic welding, a robot directs an electrode metal wire and welding current through a robotic welding torch toward a target workpiece. Components of a robotic welding torch include consumables such as an insulator, a contact tip, a nozzle, and a diffuser. The electrode metal wire feeds through a passageway in the contact tip. The welding current flows through the diffuser and the contact tip. Inert gas flows from passages in the diffuser, and the nozzle guides the gas towards the tip of the electrode metal wire. The electrode metal wire is fed from a spool and consumed as the welding process progresses. The tip of the electrode metal wire, the point where the electrode metal wire meets the target workpiece, is called the tool center point.

Welding of different workpieces may require consumables of different current or amperage capacity. Consumables capable of handling relatively higher currents may have relatively larger geometries. Known robotic welding torches and consumables may require reprogramming or recalibration of the tool center point whenever a set of consumables is replaced with consumables of a different geometry.

SUMMARY

A robotic welding torch includes a torch body and a tube. The tube has an elongated body extending from a supply end to a discharge end. The tube is operably connected to the torch body substantially at the supply end of the tube. The tube is configured to operably connect at its discharge end to a first set of consumables in a first configuration and to a second set of consumables in a second configuration.

The first set of consumables has a first amperage capacity and the second set of consumables has a second amperage capacity larger than the first amperage capacity. The tool center point of the robotic welding torch is substantially constant between the first configuration and the second configuration.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

FIG. 9A illustrates a side view of a first set of consumables configured to operate in the first configuration of the robotic welding torch.

FIG. 9B illustrates a side view of a second set of consumables configured to operate in the second configuration of the robotic welding torch.

FIG. 10A illustrates a cross-sectional view of the first set of consumables configured to operate in the first configuration of the robotic welding torch.

FIG. 10B illustrates a cross-sectional view of the second set of consumables configured to operate in the second configuration of the robotic welding torch.

DETAILED DESCRIPTION

Figure 1:
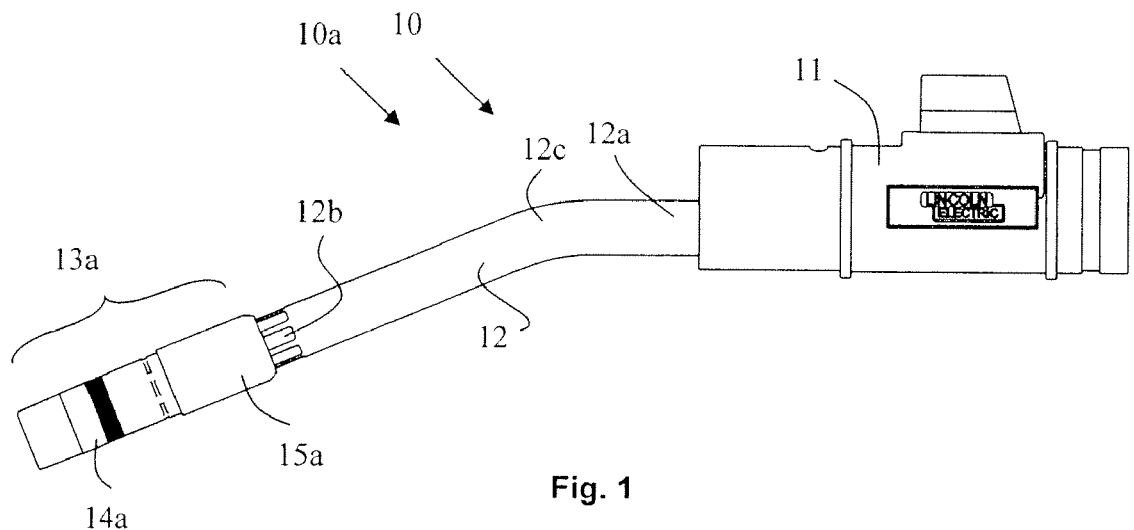
FIG. 1 illustrates a side view of a first configuration of a robotic welding torch.
Figure 2:
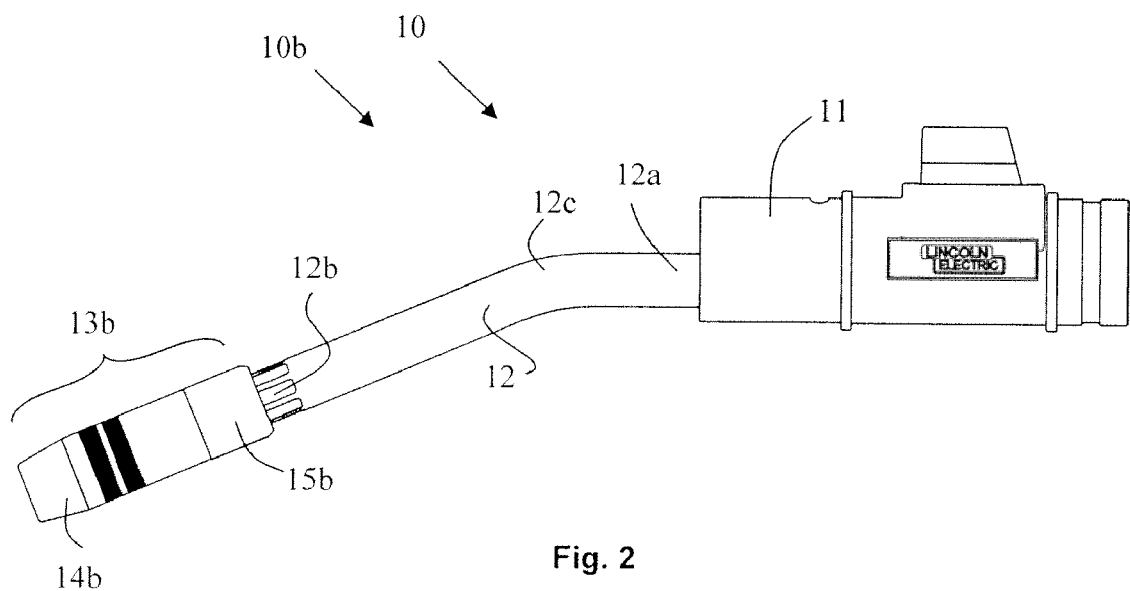
FIG. 2 illustrates a side view of a second configuration of the robotic welding torch.

FIGS. 1 and 2 illustrate side views of two configurations, 10a and 10b, of a robotic welding torch 10. FIG. 1 illustrates a side view of the first configuration 10a. FIG. 2 illustrates a side view of the second configuration 10b. The robotic welding torch 10 may operate in at least these two configurations, 10a and 10b, and may also operate in configurations other than those illustrated.

The robotic welding torch 10 includes a torch body 11, a tube 12 having an elongated body extending from a supply end 12a to a discharge end 12b. The tube 12 is operably connected substantially at the supply end 12a to the torch body 11. The tube 12 is operably connected to at least one consumable substantially at the discharge end 12b. In one embodiment, the tube 12 has at least one bend 12c giving the tube 12 the shape of a gooseneck.

In reference to FIG. 1, in the first configuration 10a, the tube 12 connects to a first set of consumables 13a including a nozzle 14a and an insulator 15a. The first set of consumables 13a may be rated to operate at a first nominal amperage or current capacity. For example, the first configuration 10a may be rated to operate at 350 Amps.

In reference to FIG. 2, in the second configuration 10b, the tube 12 connects to a second set of consumables 13b including a nozzle 14b and an insulator 15b. The second set of consumables 13b may be rated to operate at a second nominal amperage or current capacity. For example, the second configuration 10b may be rated to operate at 550 Amps.

In an alternative configuration, the first set of consumables 13a may have a current conducting capacity of 250 Amps while the second set of consumables 13b may have a current conducting capacity of 450 Amps. In another configuration, the first set of consumables 13a may have a dual current conducting rating of 250/350 Amps while the second set of consumables 13b may have a dual current conducting rating of 450/550 Amps. In other configurations, the first set of consumables 13a may have a current conducting capacity other than 250 or 350 Amps while the second set of consumables 13b may have a current conducting capacity other than 450 or 550 Amps.

In other embodiments, more than two configurations and thus more than two sets of consumables, each set with different current capacities or amperage ratings, may be provided such that the robotic welding torch 10 may operate at a theoretically infinite number of different currents while retaining a constant tool center point TCP.

Figure 3:
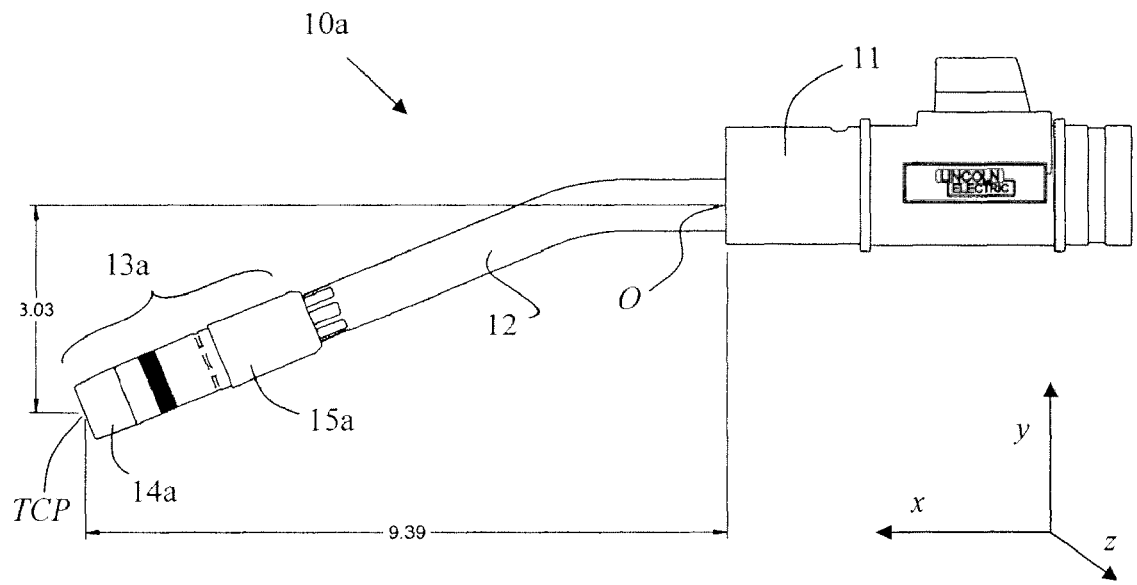
FIG. 3 illustrates a side view including exemplary dimensions of the first configuration of the robotic welding torch.
Figure 4:
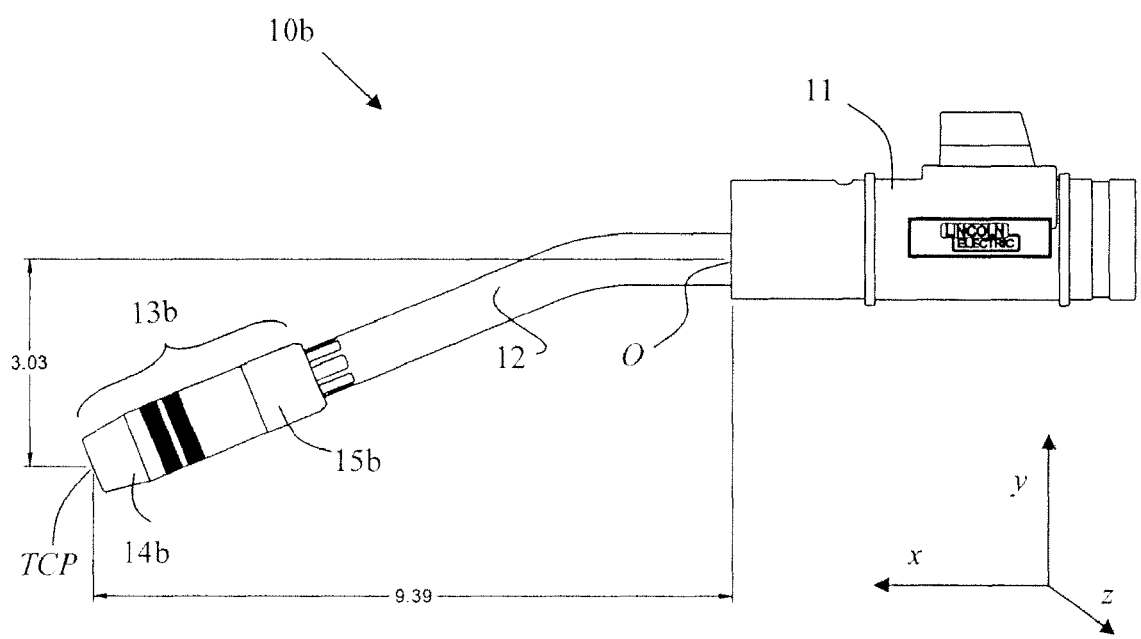
FIG. 4 illustrates a side view including exemplary dimensions of the second configuration of the robotic welding torch.

FIGS. 3 and 4 illustrate side views of the first and second configurations, 10a and 10b respectively, of the robotic welding torch 10 including exemplary dimensions for illustrative purposes. In the examples of FIGS. 3 and 4, the tool center point TCP is measured from an origin O located at an edge of the torch body 11. In the examples of FIGS. 3 and 4, the tool center point TCP is located at 9.39 inches (23.9 cm) in the x direction, 3.03 inches (7.7 cm) in the y direction and 0.00 inches (0.0 cm) in the z direction from the origin O for both the first configuration 10a and the second configuration 10b.

In the illustrated examples, although the second configuration 10b has a current conducting capacity (550 A) substantially larger than the current conducting capacity (350 A) of the first configuration 10a, the tool center point TCP of the robotic welding torch 10 is constant, or at least substantially constant, between the first configuration 10a and the second configuration 10b.

The configurations illustrated in FIGS. 3 and 4 are merely examples. A theoretically infinite number of configurations within the scope of the invention exists that have dimensions and current handling capacities different than those illustrated, but configured such that the robotic welding torch may operate at substantially different currents while retaining a constant tool center point TCP.

Figure 5:
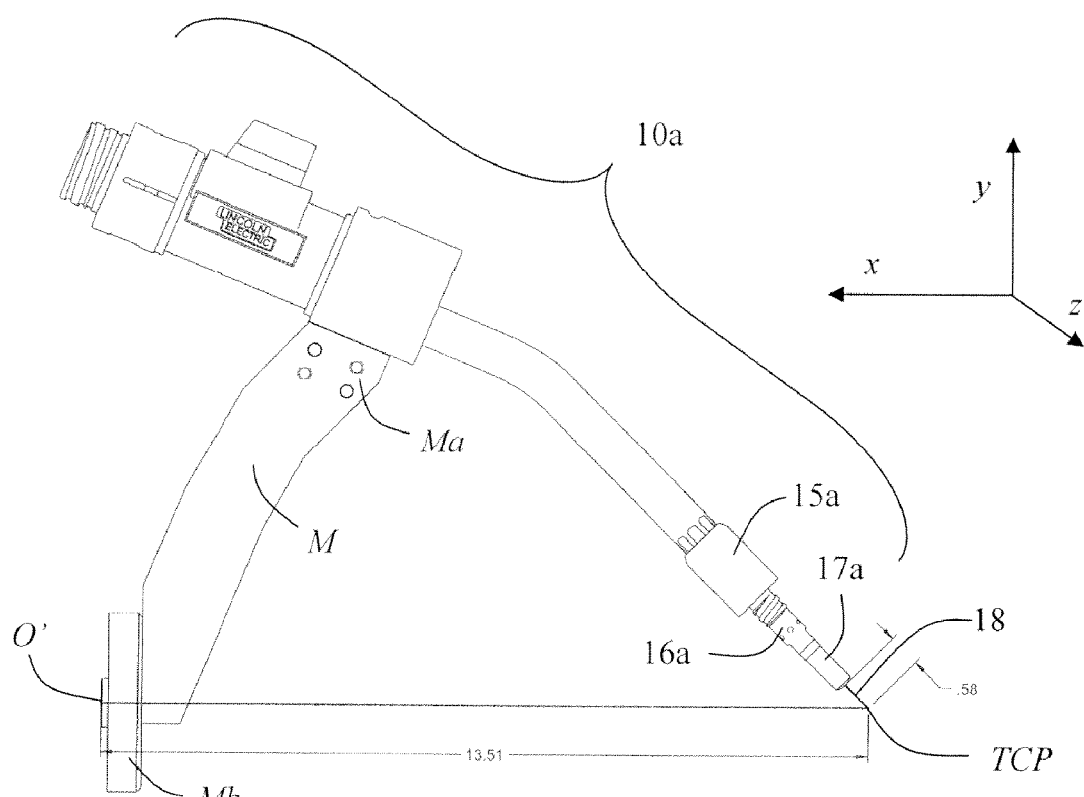
FIG. 5 illustrates a side view of the first configuration of the robotic welding torch including a torch mount.
Figure 6:
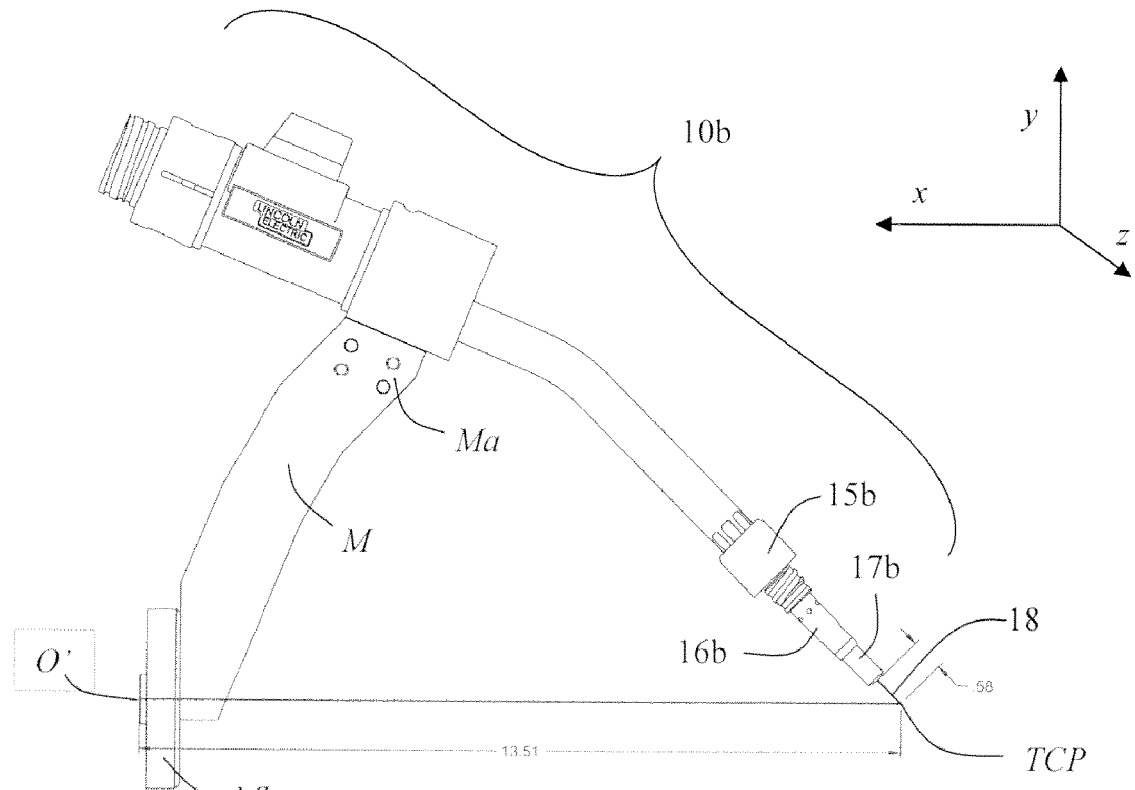
FIG. 6 illustrates a side view of the second configuration of the robotic welding torch including a torch mount.

FIGS. 5 and 6 illustrate side views of the first and second configurations. 10a and 10b respectively, of the robotic welding torch 10 including a torch mount M. FIGS. 5 and 6 include exemplary dimensions for illustrative purposes. Also for illustrative purposes, the first configuration 10a is shown without the first nozzle 14a and the second configuration 10b is shown without the second nozzle 14b.

The torch mount M may operably attach the robotic welding torch 10 to a welding robot (not shown). The torch mount M has an attachment end $M_a$ that operably attaches to the robotic welding torch 10 and a base $M_b$ that operably attaches to the welding robot (not shown).

As shown in FIG. 5, the first configuration 10a includes a first diffuser 16a and a first contact tip 17a. The first contact tip 17a has a first opening (not shown) configured to guide an electrode wire 18. The electrode wire 18 protrudes through the opening in the first contact tip 17a. The location of the tip of the electrode wire 18 is defined as the tool center point TCP.

As shown in FIG. 6, the second configuration 10b includes a second diffuser 16b and a second contact tip 17b. The second contact tip 17b has an opening (not shown) configured to guide the electrode wire 18. The electrode wire 18 protrudes through the opening in the second contact tip 17b. The tip of the electrode wire 18 is again located at the tool center point TCP.

In the examples of FIGS. 5 and 6, the tool center point TCP is measured from a second origin O' located at the torch mount base $M_b$. In the examples, the tool center point TCP is located at 13.51 inches (34.2 cm) in the x direction, 0.00 inches (0.0 cm) in the y direction and 0.00 inches (0.0 cm) in the z direction from the second origin O' for both the first configuration 10a and the second configuration 10b.

Therefore, although the second configuration 10b has a current handling capacity (550 A) substantially larger than the current handling capacity (350 A) of the first configuration 10a, the tool center point TCP of the robotic welding torch 10 is substantially constant between the first configuration 10a and the second configuration 10b.

The configurations illustrated in FIGS. 5 and 6 are merely examples. A theoretically infinite number of configurations encompassed within the scope of the invention may be devised to have dimensions and current handling capacities different than those illustrated, but configured such that the robotic welding torch may operate at substantially different currents while retaining a constant tool center point TCP.

Figure 7:
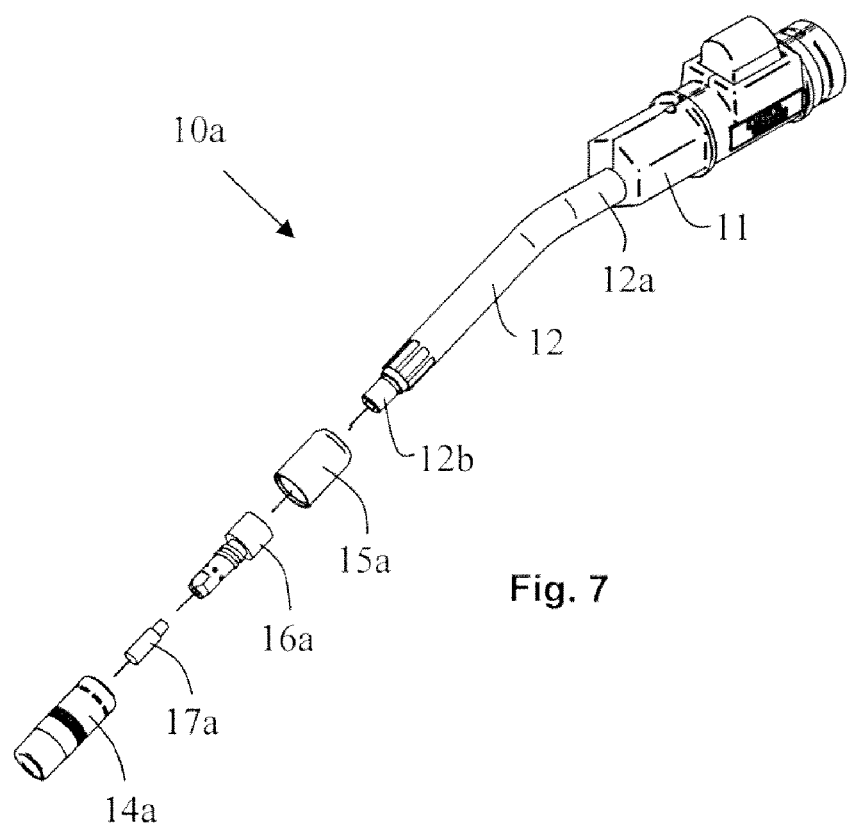
FIG. 7 illustrates an exploded perspective view of the first configuration of the robotic welding torch.
Figure 8:
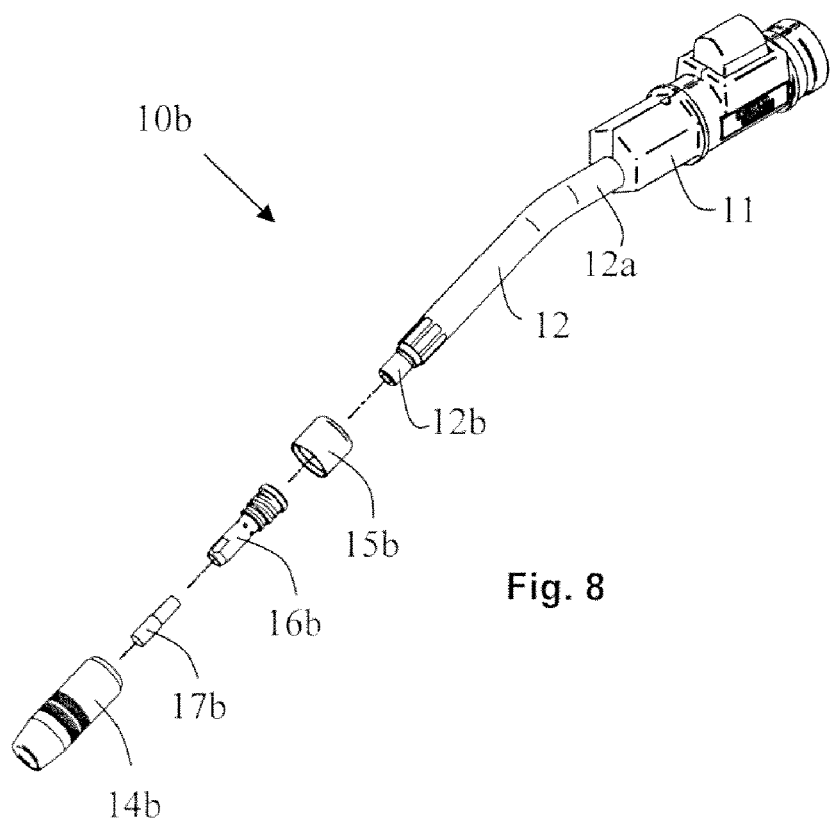
FIG. 8 illustrates an exploded perspective view of the second configuration of the robotic welding torch.

FIGS. 7 and 8 illustrate exploded perspective views of the first configuration 10a and the second configuration 10b of the robotic welding torch 10.

The first configuration 10a includes the first set of consumables 13a, including the first nozzle 14a, the first insulator 15a, the first diffuser 16a, and the first contact tip 17a. This first set of consumables 13a connects to the tube 12 substantially at the discharge end 12b and the tube 12 connects to the torch body 11 substantially at the supply end 12a.

The second configuration 10b includes the second set of consumables 13b including the second nozzle 14b, the second insulator 15b, the second diffuser 16b, and the second contact tip 17b. Like the first set of consumables, the second set of consumables connects to the tube 12 substantially at the discharge end 12b and the tube 12 connects to the torch body 11 substantially at the supply end 12a.

FIGS. 9A and 9B illustrate side views of the first set of consumables 13a and the second set of consumables 13b, respectively. The first set of consumables 13a includes the first nozzle 14a and the first insulator 15a. The second set of consumables includes the second nozzle 14b and the second insulator 15b. The bodies of the first nozzle 14a and the second nozzle 14b have different geometries. The bodies of the first insulator 15a and the second insulator 15b have different geometries.

FIGS. 10A and 10B illustrate cross-sectional views of the first set of consumables 13a and the second set of consumables 13b, respectively. The first set of consumables 13a and the second set of consumables 13b are shown without the first insulator 15a and the second insulator 15b, respectively. The first set of consumables 13a includes the first nozzle 14a, the first diffuser 16a, and the first contact tip 17a. The second set of consumables 13b includes the second nozzle 14b, the second diffuser 16b, and the second contact tip 17b.

The body of the first diffuser 16a has a geometry different from the geometry of the body of the second diffuser 16b, and the body of the first contact tip 17a has a geometry different from the geometry of the body of the second contact tip 17b. The different geometries give the second set of consumables 13b substantially larger current conducting capacity than that of the first set of consumables 13a. However, the geometries of the first and second sets of consumables 13a and 13b are such that the tool center point TCP of the robotic welding torch remains substantially constant regardless of which set of consumables, the first set of consumables 13a or the second set of consumables 13b, is used.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection performs its intended purpose. For example, two entities may be operably connected to each other directly or through one or more intermediate entities.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A robotic welding torch configured to operate with consumables of substantially different amperage ratings, the robotic welding torch comprising:
    a torch body;
    a tube having an elongated body extending from a supply end to a discharge end, where the tube is operably connected substantially at the supply end to the torch body;
    where the robotic welding torch is configured to operate in at least two configurations including:
        a first configuration having a first set of consumables rated to operate at a first amperage and configured to be operably connected to the tube substantially at the discharge end, where the first set of consumables comprises:
            a first diffuser having a first diffuser geometry, and
            a first contact tip having a first contact tip geometry, where the first contact tip has a first opening configured to guide electrode wire through, and
        a second configuration having a second set of consumables rated to operate at a second amperage substantially larger than the first amperage and configured to be operably connected to the tube substantially at the discharge end, where the second set of consumables comprises:
            a second diffuser having a second diffuser geometry different from the first diffuser geometry, and
            a second contact tip having a second contact tip geometry different from the first contact tip geometry, where the second contact tip has a second opening configured to guide the electrode wire through; and
    where the robotic welding torch has a tool center point corresponding to an end of the electrode wire, and where the tool center point of the first configuration is substantially the same as the tool center point of the second configuration.

2. The robotic welding torch of claim 1, where the elongated body of the tube has at least one bend forming a gooseneck.

3. The robotic welding torch of claim 1, where the first amperage is 350 amps and the second amperage is 550 amps.

4. The robotic welding torch of claim 1, where the first amperage is 250 amps and the second amperage is 450 amps.

5. The robotic welding torch of claim 1, where the first amperage is 250/350 amps and the second amperage is 450/550 amps.

6. The robotic welding torch of claim 1, further comprising:
    means for mounting the robotic welding torch to a welding robot.

7. The robotic welding torch of claim 1:
    where the first set of consumables further comprises a first insulator having a first insulator geometry, and
    where the second set of consumables further comprises a second insulator having a second insulator geometry different from the first insulator geometry.

8. The robotic welding torch of claim 1:
    where the first set of consumables further comprises a first nozzle having a first nozzle geometry, and
    where the second set of consumables further comprises a second nozzle having a second nozzle geometry different from the first nozzle geometry.

9. A plurality of consumables, each consumable configured to operate in a robotic welding torch comprising a torch body and a gooseneck having an elongated body extending from a supply end to a discharge end, where the gooseneck is operably connected substantially at the supply end to the torch body, the plurality of consumables comprising:
    a first set of consumables having a first geometry and a first amperage capacity and configured to operably connect to the gooseneck and define a first tool center point; and
    a second set of consumables having a second geometry substantially different from the first geometry, and a second amperage capacity substantially larger than the first amperage capacity and configured to operably connect to the gooseneck and define a second tool center point substantially the same as the first tool center point.

10. The plurality of consumables of claim 9,
    where the first set of consumables comprises:
        a first insulator having a first insulator geometry,
        a first diffuser having a first diffuser geometry, and
        a first contact tip having a first contact tip geometry, where the first contact tip has a first opening configured to guide electrode wire through, and
    where the second set of consumables comprises:
        a second insulator having a second insulator geometry different from the first insulator geometry,
        a second diffuser having a second diffuser geometry different from the first diffuser geometry, and
        a second contact tip having a second contact tip geometry different from the first contact tip geometry, where the second contact tip has a second opening configured to guide the electrode wire through; and
    where the first tool center point and the second tool center point correspond to an end of a portion of the electrode wire protruding through one of the first opening and the second opening.

11. The plurality of consumables of claim 9, where of the plurality of consumables includes at least one of:
    an insulator;
    a diffuser;
    a contact tip; and
    a nozzle.

12. The plurality of consumables of claim 9, where the first amperage capacity is 350 amps and the second amperage capacity is 550 amps.

13. The plurality of consumables of claim 9, where the first amperage capacity is 250 amps and the second amperage capacity is 450 amps.

14. The plurality of consumables of claim 9, where the first amperage capacity is 250/350 amps and the second amperage capacity is 450/550 amps.

15. A consumable configured to operate in a robotic welding torch, the consumable comprising:
   a body;
   where the consumable is part of a set of consumables,
   where the set of consumables is one of a first set of consumables and a second set of consumables,
   where the first set of consumables has a first geometry and a first current conducting capacity,
   where the second set of consumables has a second geometry substantially different from the first geometry, and a second current conducting capacity substantially different from the first current conducting capacity,
   where the set of consumables includes at least one of:
      an insulator,
      a diffuser,
      a contact tip, and
      a nozzle, and
   where the robotic welding torch equipped with the first set of consumables and the robotic welding torch equipped with the second set of consumables have a common tool center point.

16. The consumable of claim 15, where the first set of consumables has a current conducting capacity of 350 amps and the second set of consumables has a current conducting capacity of 550 amps.

17. The consumable of claim 15, where the first set of consumables has a current conducting capacity of 250 amps and the second set of consumables has a current conducting capacity of 450 amps.

18. The consumable of claim 15, where the consumable has a current conducting capacity of 250 amps.

19. The consumable of claim 15, where the consumable has current conducting capacity of 550 amps.

20. The consumable of claim 15, where the consumable is one of:
   the insulator;
   the diffuser;
   the contact tip; and
   the nozzle.

* * * * *